United States Patent
Ishii (10) Patent No.: US 12,510,060 B2
(45) Date of Patent: Dec. 30, 2025

(54) METHOD FOR STORING COMPRESSED AIR ENERGY

(71) Applicants: Toyo Engineering Corporation, Tokyo (JP); Yoshikazu Ishii, Atami (JP)

(72) Inventor: Yoshikazu Ishii, Atami (JP)

(73) Assignees: TOYO ENGINEERING CORPORATION, Tokyo (JP); Yoshikazu Ishii, Atami (JP)

( * ) Notice: Subject to any disclaimer, the term of this patent is extended or adjusted under 35 U.S.C. 154(b) by 0 days.

(21) Appl. No.: 18/868,237

(22) PCT Filed: May 23, 2023

(86) PCT No.: PCT/JP2023/019122
§ 371 (c)(1),
(2) Date: Nov. 22, 2024

(87) PCT Pub. No.: WO2023/228938
PCT Pub. Date: Nov. 30, 2023

(65) Prior Publication Data
US 2025/0334105 A1    Oct. 30, 2025

(30) Foreign Application Priority Data

May 24, 2022 (JP) ................................ 2022-093996

(51) Int. Cl.
*F03G 7/00* (2006.01)
*F02C 1/04* (2006.01)

(52) U.S. Cl.
CPC .............. *F03G 7/0254* (2021.08); *F02C 1/04* (2013.01); *F03G 7/0252* (2021.08); *F05B 2220/30* (2013.01); *F05B 2260/20* (2013.01)

(58) Field of Classification Search
CPC ........ F03G 7/0254; F03G 7/0252; F02C 1/04; F05B 2220/30; F05B 2260/20
(Continued)

(56) References Cited

U.S. PATENT DOCUMENTS

| 4,392,354 A | * | 7/1983 | Schwarzenbach | ........ F02C 6/16 |
| | | | | 60/659 |
| 10,208,666 B2 | * | 2/2019 | Merswolke | ............. F28D 20/00 |

(Continued)

FOREIGN PATENT DOCUMENTS

EP    3255266 B1    12/2017
JP    56146527 A    11/1981
(Continued)

OTHER PUBLICATIONS

English Translation of the International Preliminary Report on Patentability, issued in corresponding International Application No. PCT/JP2023/019122, Date of Mailing Dec. 5, 2024 (5 pages).
(Continued)

*Primary Examiner* — Hoang M Nguyen
(74) *Attorney, Agent, or Firm* — FLYNN THIEL, P.C.

(57) ABSTRACT

An economical compressed air energy storage (CAES) method effectively utilizing the capacity of space in the air storage portion in CAES plants to reduce the plant costs thereof is provided. An air storage portion is configured from a plurality of vessels, and a film to provide spaces with freely deformable shapes is disposed within each vessel. In the air compression step, the space on one side of the film within each vessel is filled in advance with a cushion gas, air is stored in the space on the other side of the film, and the cushion gas is changed into a fluid with a reduced volume to increase the amount of the air stored in the space on the other side of the film. In the air expansion step, fluid is heated and vaporized to decrease the amount of the air remaining on the other side of the film.

5 Claims, 2 Drawing Sheets

(58) Field of Classification Search
USPC .................................................. 60/650, 659
See application file for complete search history.

(56) References Cited

U.S. PATENT DOCUMENTS

2020/0149787 A1* 5/2020 Ishisaka ................. F25B 25/02
2022/0145778 A1  5/2022 Spadacini

FOREIGN PATENT DOCUMENTS

| JP | 7330079 A | 12/1995 |
| JP | 2021103916 A | 7/2021 |
| JP | 2022520218 A | 3/2022 |
| WO | 2007096656 A1 | 8/2007 |
| WO | 2009146101 A2 | 12/2009 |

OTHER PUBLICATIONS

International Search Report, with English translation, issued in corresponding International Application No. PCT/JP2023/019122, date of mailing Aug. 8, 2023 (5 pages).
Written Opinion of the International Searching Authority issued in corresponding International Application No. PCT/JP2023/019122, date of mailing Aug. 8, 2023 (3 pages).
Victor de Biasi; Fundamental analyses to optimize adiabatic CAES plant efficiencies; Gas Turbine World, Sep.-Oct. 2009, vol. 39, No. 5 (4 pages).
S. Eckroad; Handbook of Energy Storage for Transmission or Distribution Applications; EPRI Report—1007189; Compressed Air Energy Storage (CAES) Chapter; Dec. 2002 (7 pages).

* cited by examiner

METHOD FOR STORING COMPRESSED AIR ENERGY

FIELD OF THE INVENTION

The present invention relates to a method for storing compressed air energy (Compressed Air Energy Storage, hereinafter referred to as CAES) that is utilized when surplus electricity generated during time periods when the supply exceeds the demand in electrical grids or the like is temporarily stored as energy of compressed air, and this compressed air is used for recovering electricity again during time periods when the supply is insufficient, and others. More specifically, the present invention relates to a method for storing compressed air energy that enables effective utilization of a storage facility for the compressed air.

CAES plants that include a compressed air storage portion in which steel vessels such as steel pipes or the like are used tend to be less cost-effective due to a high steel material cost in this portion. The present invention aims to reduce plant costs in a method for storing compressed air energy by using a cushion gas to improve the efficiency for utilizing the capacity of space in the compressed air storage portion.

Here, the term cushion gas is defined as follows. If air is charged into a vessel filled in advance with some gas, this gas is pressurized by the pressure of the air and reduces its volume. At the same time, the presence of this gas has the effect of preventing a drastic reduction in the pressure of the charged air within the vessel. If a film member that separates the two gases from one another is present within this vessel, the air alone can be selectively discharged from this vessel. In this process, the gas remaining within the vessel increases its volume as pressure decreases. As a result, this gas has the effect of pushing the air out of the vessel to the outside. Thus, in the processes of charging and discharging the air, the gas with which the inside of the vessel is filled in advance acts as a resilient cushion medium on the air within the vessel. The term cushion gas defined herein refers to a predetermined amount of gas with which the inside of the compressed air storage portion is filled in advance, the gas being separated from the compressed air by the film member. If this gas is matter that changes its volume more significantly compared to the air in the compression and expansion processes, a larger cushion effect can be obtained.

While CAES methods are classified as adiabatic, diabatic, or a combination of the two or the like, all the types of methods require an air storage portion. Accordingly, the present invention using the cushion gas to improve the efficiency for utilizing the capacity of space in the air storage portion can be commonly applied to these various types of methods, and can produce the effect on all the types of methods.

BACKGROUND OF THE INVENTION

Electricity demand varies depending on the season, the time period or the like. Further, if the supply of electricity derived from renewable energy, such as sunlight, wind power and others, which fluctuates depending on weather conditions, day and night cycles or the like, is involved, maintaining a balance between electrical energy demand and supply in electrical grids becomes problematic. If surplus electricity occurs in electrical grids or the like, it is required that this electricity be temporarily stored, and this be transferred into other high demand periods and reused. As the introduction of electrical energy derived from highly fluctuating renewable energy increases, electricity storage technologies play an increasingly important role as a means for effectual use of surplus electricity.

A pumped-storage hydropower generation method utilizing physical energy due to the height difference between locations is an excellent electricity storage method, and this method is used in an overwhelming majority of electricity storage facilities currently in operation. As a physical electricity storage method like pumped-storage hydropower generation, a method for storing compressed air energy (CAES) which stores electricity by converting it into compressed air energy is also an excellent electricity storage method, and large-scale electricity storage plants in which compressed air is stored in a cavern provided in an underground rock salt layer have been in operation for many years. This method stores electricity as compressed air energy by driving compressors, and when electricity is required, recovers electricity again by driving expanders with this compressed air. Basically, CAES plants are configured from an electric motor, a compressor, a heat exchanger that removes heat of compression, a storage portion for compressed air, a heating unit for compressed air, an expander, and an electric generator. Hereinafter, an example of a CAES method is described with reference to FIG. 1 using reference numerals.

Figure 1:
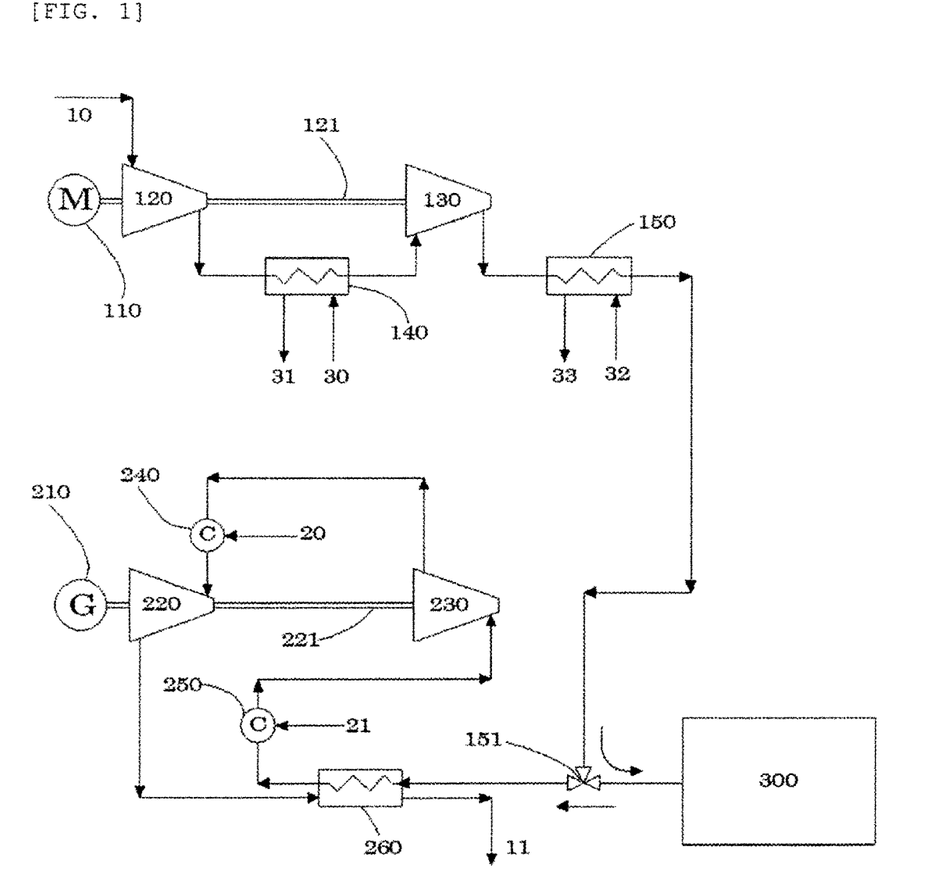
FIG. 1 A schematic view that illustrates the overall configuration of a conventional diabatic compressed air energy storage (CAES) plant FIG. 2 A schematic view that illustrates the overall configuration of the CAES plant of the first embodiment of the present invention

In this example, when electricity is input, air 10 is compressed into compressed air at two stages by a low-pressure compressor 120 and a high-pressure compressor 130 that are driven by a motor 110 via a shaft 121. Subsequently, the compressed air is stored in an air storage portion 300. Conventionally, a cavern provided in an underground rock salt layer has been used as a storage portion in CAES plants, but there are various alternatives such as other formations or high-pressure steel vessels installed on the ground and others. The compressors are accompanied by aftercoolers 140 and 150, respectively, which remove heat of compression generated in the compressors. Cooling water 30 and cooling water 32 are supplied respectively to the aftercoolers 140 and 150, and cooling water 31 and cooling water 33 that have absorbed the heat of compression are discharged therefrom. When electricity is required, a high-pressure expander 230 and a low-pressure expander 220 are driven by the compressed air stored in the air storage portion 300. In this case, fuel 21 and fuel 20 are supplied to a high-pressure combustor 250 and a low-pressure combustor 240 that are each disposed at the air inlet of each expander, thereby heating the compressed air entering each combustor. Concurrently, the compressed air energy is converted into electricity again by the activation of an electric generator 210 coupled to the high-pressure combustor 250 and the low-pressure combustor 240 via a drive shaft 221. In this process of heating, thermal efficiency can be improved by utilizing heat recovered in a regenerative heat exchanger 260 through heat exchange between a high-temperature exhaust gas from the low-pressure expander 220 and the stored air from the air storage portion 300. Air 11 that has passed through the regenerative heat exchanger 260 is exhausted into the atmosphere.

Conventional CAES methods can be classified as adiabatic and diabatic. In a diabatic method, the heat of compression generated during the compression of air is cooled and removed to the outside of the system, and during power recovery, it is necessary to heat the compressed air by supplying fuel at the inlet of the expander. There have long been large-scale examples of diabatic CAES methods, and FIG. 1 illustrates a typical example of this type of method.

In an adiabatic CAES method, the heat of compression generated during the compression of air is stored, and this thermal energy is reused during power recovery. This type of method can achieve higher thermal efficiency than is achieved by a diabatic method as it does not use fuel during power recovery. In FIG. 1 that illustrates a diabatic CAES method, the heat of compression generated in each compressor is removed by each of the aftercoolers 140 and 150. In an adiabatic CAES method, the heat is recovered by the corresponding portions of the aftercoolers 140 and 150 disposed in a diabatic method. A storage for storing thermal energy recovered there is required, and this storage is referred to as TES (Thermal Energy Storage). Due to the presence of this thermal storage, various types of adiabatic CAES are possible, and a typical example thereof is disclosed in non-patent literature 1.

On the other hand, in an adiabatic CAES method, the inlet temperature of the expander during power recovery is lower compared to that in a diabatic method in which combustion heat is used. Further, in addition thereto, due to losses of the stored heat, the recoverable power in an adiabatic CAES method tends to be lower than in a diabatic CAES method. As a result, in an adiabatic method, the power generation amount with respect to the unit compressed air amount is low, and the plant cost per recovered electrical energy tends to be relatively higher than in a diabatic method. As a countermeasure against this, patent literature 1 proposes an adiabatic and diabatic hybrid CAES system.

CAES methods in which the capacity of space in the compressed air storage portion is used without waste have also been proposed. For example, there is a method in which a compressed air storage portion is filled in advance with water, and the water is discharged as the amount of air in this portion increases during the injection of air. When the compressed air energy is recovered as power, the water is allowed to flow into the air storage portion again to replace all the amount of air inside with the water, and thus, the capacity of the storage portion can be utilized to the fullest. This method is also advantageous in that the air storage portion can be always kept at a constant pressure. However, this method requires a large-capacity reservoir provided at a sufficiently high location to be equivalent to the storage pressure of the air, and the topographical constraints become a problem.

As a method for improving the efficiency for utilizing the capacity of space in the air storage portion, there is a method in which a compressible gas is used in place of water that is not compressible. Patent literature 2 proposes a method of utilizing a cushion effect of a compressible gas for air storage, wherein carbon dioxide is used in a formation such as a porous sandstone layer or the like located at great depths. In this CAES method, the formation in which air is stored is filled in advance with a sufficient amount of carbon dioxide. If compressed air is injected thereinto, the density of carbon dioxide increases with an increase in pressure. If the operating condition at this time is near the critical pressure or equal to or greater than that, the density of carbon dioxide drastically increases or decreases, and thus, its volume also drastically decreases or increases. When the air is discharged, the volume of carbon dioxide drastically increases with a decrease in the pressure of the storage layer, enabling the air to be expelled from the storage layer so that the amount of air to be stored in the air storage layer is increased. Thus, carbon dioxide effectively functions as a cushion gas within the porous formation, thereby improving the efficiency for utilizing the capacity of space in the air storage portion.

In this method, the boundary surface of the air and that of carbon dioxide in the formation are made in direct contact with one another, and there is the fear of mixing of the two fluids. This method avoids excessive mixing by taking advantage of the fact that the lower the level within the layer, the higher the pressure. In other words, in the sandstone layer or the like, the fluid density of carbon dioxide becomes higher in a lower layer, and thus, mixing with low-density air retained in an upper layer can be reduced. However, this method is subject to constraints on site conditions such as formations, topographical properties or the like, and it is difficult to apply this method to a storage portion formed of steel vessels or the like installed on the ground.

It is advantageous if CAES plants can be installed on the ground regardless of site conditions. In this case, utilizing steel pipes or steel vessels for the air storage portion is a practical option. However, in this method, the vessel portion has excessively large capacity of space, and there is the fear of a high steel material cost in this portion. As an example of a countermeasure against this, there is a method as disclosed in patent literature 3, in which compressed air is liquefied to reduce storage capacity, and this is stored in a facility provided on the ground. Further, in this method, the liquid air can be stored at normal pressure, and thus, the installation cost of the air storage portion can be significantly reduced. However, there are problems in this method that the air liquefaction facility is expensive, and generation of cold energy required for liquefaction causes reduction of energy efficiency.

Various attempts including the above liquefaction method are in process for CAES plants installed on the ground in which steel vessels such as steel pipes or the like are used. The present invention is also among such a tendency, and tries to realize an economical CAES method by effectively utilizing the capacity of space in the air storage portion configured from steel pipes or steel vessels that cause an excessively high plant cost.

CITATION LIST

Patent Literature

Patent literature 1: EP-B 3255266
Patent literature 2: WO-A 2009/146101
Patent literature 3: WO-A 2007/096656

Non-Patent Literature

Non-patent literature 1: de Biasi, "Fundamental analyses to optimize adiabatic CAES plant efficiencies," Gas Turbine World, September-October (2009)
Non-patent literature 2: Eckroad, S., "Handbook of Energy Storage for Transmission or Distribution Applications," EPRI Report-1007189 (2002)

SUMMARY OF THE INVENTION

Problem to be Solved

An object of the present invention is to provide an economical CAES method. For this object, it is necessary to effectively utilize the capacity of space in the air storage portion. The present invention solves the aforementioned issues in the conventional CAES methods from this viewpoint, thereby achieving the above object.

In conventional CAES methods, despite a high proportion of the cost of the air storage portion to the total plant cost, the efficiency for utilizing the capacity of this portion is very low. For example, it is well known that, in a CAES method in which air is stored in a cavern provided in an underground rock salt layer, the efficiency for utilizing the capacity of the cavern is low. While non-patent literature 2 shows the pressure variation range during operation for each of the CAES plants in Huntorf (Germany) and McIntosh (USA), in both cases, the expansion step is ceased while there remains compressed air whose pressure is greater than 60% relative to the maximum storage pressure during the compression step. Thus, conventional CAES methods have room for improvement in terms of the efficiency for utilizing the capacity of the air storage portion, and the present invention achieves the reduction of the entire plant cost by improving this point.

In CAES methods, the pressure of the air storage portion increases with the passage of time in the compression step and decreases with the passage of time in the expansion step. If the pressure of the air storage portion decreases too much in the expansion step, the expander cannot fulfill its function to a sufficient degree, and thus, the expansion step needs to be ceased at the point of time when the pressure decreases to a predetermined pressure. Accordingly, if there is any method that can reduce the amount of the air remaining within the storage portion when the pressure is equivalent to the pressure at the end of the expansion step, the efficiency for utilizing the capacity of space in the air storage portion can be increased.

In CAES plants utilizing a cavern provided at great depths such as in a rock salt layer or the like, a formation such as a porous sandstone layer or the like, an abandoned mine, or the depth of water in a lake or in the ocean, or the like, the cost of the air storage portion can be reduced to some degree as benefits of the natural conditions are harnessed as they are. However, there are a limited number of sites where such natural conditions are available, and it is advantageous if CAES plants can be installed in required locations without being subject to site constraints. In this case, as an example, it is assumed that compressed air is stored in steel vessels such as steel pipes or the like installed on the ground, but this requires a large amount of steel materials, and the cost thereof is high. If the efficiency for utilizing the capacity of space in the air storage portion can be improved, it is also possible to achieve the cost reduction in CAES plants in which compressed air is stored in steel vessels.

As a method for effectively utilizing the capacity of space in the air storage portion, there is a CAES method in which air within the storage portion is replaced with water. However, it is also impractical to adopt this method as a CAES method to which the present invention is directed because of topographical constraints.

As mentioned earlier, patent literature 2 discloses a method in which a cushion gas is used to improve the efficiency for utilizing the capacity of the underground air storage portion such as a porous sandstone layer or the like. This method uses carbon dioxide as the cushion gas and takes advantage of the property of this substance whose fluid density drastically changes in response to a pressure change in the range near or above the critical point. In this method, while there is the fear of mixing of air as a working gas with the cushion gas on the boundary surfaces of the two, the mixing of the two gases can be suppressed to a minimum because in the underground formation, the high-density cushion gas is retained in a lower layer than the air, and the lower the layer, the greater the density of the cushion gas increases with an increase in pressure.

Assuming that high-pressure air is stored in steel vessels including steel pipes, and a cushion gas is used therein, the problem is how to avoid the cushion gas and air mixing issue. In the above example in which air is stored in a sandstone layer or the like, the thickness of the formation has such a height difference as is expressed in units of 100 m, and a drastic change in the fluid density of the cushion gas therein is utilized to prevent excessive mixing between the two. On the other hand, it is difficult to actually realize a structure having such a height difference within a steel vessel. If there is any method that can prevent the cushion gas from mixing with the air within the air storage portion so that the gas exhibits its cushion effect, improvement on the efficiency for utilizing the capacity of space in the air storage portion can be expected. As a countermeasure against this, in the present invention, the cushion gas is separated from air as a working gas within the storage portion to prevent mixing between the two.

An increased cushion effect can be obtained by utilizing a change in the fluid density of the cushion gas associated with a change in pressure from a pressure equal to or lower than its critical pressure to a pressure near or equal to or greater than its critical point. Accordingly, matter which is desirable as a cushion gas is selected by considering the relation thereof with pressure changes in the compression and expansion steps.

In the above example in which air is stored in a sandstone layer or the like, the cushion effect is produced by an increase and a decrease in the volume of the cushion gas associated with a change in its density due to a pressure change. However, a change in density not only depends on pressure but also on temperature, and if both pressure and temperature are allowed to affect fluid density, the function as a cushion gas can be further increased. Therefore, the present invention also takes advantage of a cushion effect due to temperature. Accordingly, how to handle a cushion gas considering cooling and heating has been studied.

While the heat of compression generated in the compression step is removed in diabatic CAES methods in which fuel is consumed, the heat of compression is recovered and reused in adiabatic methods. Further, a hybrid CAES method in which heating by using fuel and recovering the heat of compression are performed has also been proposed. The present invention does not belong to a specific CAES method, and various alternatives for the way in which the heat of compression and fuel are used are possible.

Solution to Problem

The present invention provides a method for storing air that solves the aforementioned problems in CAES plants. More specifically, the present invention provides a measure to effectively utilize the capacity of space in the air storage portion in CAES plants.

The method for storing compressed air energy of the first embodiment of the present invention includes a compression step of converting electricity into energy of compressed air and storing the compressed air in one or more vessels, and an expansion step of expanding the stored compressed air to recover the electricity, the compression step and the expansion step being performed alternately, wherein the vessels are such that, in all or part of the vessels, a single film or a plurality of films to form spaces having surfaces with freely deformable shapes is disposed within each vessel, thereby forming a plurality of partial spaces within the vessel, the method having the following series of operations: by the start of the compression step, the partial space formed on one side of the surfaces of the film within the vessel is filled with a cushion gas; in the compression step, the compressed air is stored in the partial space on the other side of the surfaces of the film within the vessel without being mixed with the cushion gas, and the cushion gas is changed into a fluid with a reduced volume while retained within the vessel or sent to the outside of the vessel, thereby increasing the amount of the compressed air stored in the partial space on the other side of the surfaces; and in the expansion step, the fluid present within or outside the vessel is vaporized and restored as the cushion gas in the partial space on the one side of the surfaces within the vessel, thereby decreasing the amount of the compressed air remaining within the vessel.

EMBODIMENTS OF THE INVENTION

First Embodiment

The first embodiment of the present invention is hereinafter explained with reference to FIG. 2. In a CAES (i.e., compressed air energy storage) plant, the air storage portion 300 is a facility that is commonly required for various types of CAES methods such as an adiabatic method, a diabatic method, or a combination of the two or the like. In the first embodiment of the present invention, a case where the air storage portion 300 is configured from steel pipes or steel vessels 301 is explained as an example, but the present invention can be commonly applied to CAES plants provided with the air storage portion 300 including the vessels 301 not made of steel. Further, the plant configuration except for the air storage portion 300 and operating method of the diabatic CAES plant shown in FIG. 1 can be appropriately applied to the first embodiment of the present invention.

The overall flow of the method for storing compressed air energy of the present invention is hereinafter explained with reference to FIG. 2. FIG. 2 illustrates the overall configuration of the CAES plant of the first embodiment together with reference numerals. The CAES plant of the first embodiment includes the low-pressure compressor 120, the high-pressure compressor 130, a thermal storage tank 160, the aftercooler 150, a high-temperature water tank 330, a low-temperature water tank 340, a heat exchanger 320, the air storage portion 300, a $CO_2$ storage portion 310, the low-pressure expander 220, the high-pressure expander 230, the regenerative heat exchanger 260 and others. In the present embodiment, the air storage portion 300 is configured by disposing the plurality of vessels 301 that are made of linear steel pipes arranged in parallel, as shown in a portion surrounded by a dotted line in FIG. 2.

In the present invention, a film that separates a cushion gas from air is disposed within each air storage portion, thereby forming partial spaces and preventing mixing between the two, thus selectively discharging the air to the outside of the system. Thus, the efficiency for utilizing the capacity of space in the air storage portion can be improved, and a net amount of the stored air can be increased.

The material of the film is explained. The film may be made of any material as long as it has strength and durability that can be adapted to the pressure and temperature of a fluid which changes into a gas phase and a liquid phase. For example, the film may be formed of a resin film member which is thin and strong and does not expand and contract.

Next, the overall flow of the method for storing compressed air energy is explained. By the start of the air compression step, carbon dioxide is charged in advance into a predetermined space within each vessel 301. This charging process is included in a compressed air expansion step which is subsequent to a previous compression step in the compression step and the expansion step performed alternately. The cushion gas is put in advance into the partial space surrounded by a vessel inner surface of each air vessel 301 and one surface of the film. The film is inflated by the charged cushion gas to be brought into a state where the opposite surface of the one surface, i.e., the other surface, is in intimate contact with the vessel inner surface.

In the subsequent compression step, compressed air is stored in a partial space that is separated from the cushion gas by the film. In the compression step, the air 10 taken in from the atmosphere is pressurized into the compressed air by the low-pressure compressor 120 and the high-pressure compressor 130 successively, and finally stored in the air storage portion 300 via the aftercooler 150 and a three-way valve 151. The low-pressure compressor 120 and the high-pressure compressor 130 are driven together by the motor 110 via the shaft 121. Heat of compression generated in the low-pressure compressor 120 and that generated in the high-pressure compressor 130 are removed respectively by thermal storage in the thermal storage tank 160 and heat exchange in the aftercooler 150, as described below. In this step, the cushion gas which is separated from the compressed air is also compressed concurrently, and the cushion gas is pushed out to the outside of the vessels 301 by the pressure of the compressed air.

The heat of compression from the low-pressure compressor 120 is temporarily stored in the thermal storage tank 160 in the following manner so that it is reused in the expansion step. A possible storage method for the heat of compression is a method of transferring the heat to a fluid such as a heating medium oil or the like through the heat transfer surface of a heat exchanger, but adopted herein is a direct heat transfer method that uses, as a heating medium, a particulate solid made of small-diameter rock stones, which is accommodated in the thermal storage tank 160 while not shown in the figure. This method requires a pressure-resistant vessel, but is characterized by good heat transfer properties and reduced pressure losses. The thermal storage tank 160 is in the shape of an upright cylinder, and the high-temperature air from the low-pressure compressor 120 is sent into the top of it. In the thermal storage tank 160, thermal energy that has been used in the immediately preceding expansion step is stored, and thus, the temperature of the thermal storage tank 160 at the start of the compression step is lower than during the thermal storage of the heat of compression. In the compression step, the thermal storage amount within the thermal storage tank 160 increases with the passage of time, and the temperature boundary line between the high-temperature side and the low-temperature side of the heating medium, which is at first located at the top of the thermal storage tank 160, gradually moves toward the bottom. The temperature of the compressed air is lowered by thus removing the heat of compression, and concurrently, the heat is stored within the thermal storage tank 160. In the expansion step, contrary to the compression step, low-temperature air is sent into a lower portion of the thermal storage tank 160, and this air is heated by the heat stored in the thermal storage tank 160, and discharged from the top of the thermal storage tank 160. The heat recovered here is used to increase the temperature of air to be introduced into the high-pressure expander 230 in the expansion step, as described later.

The air from the low-pressure compressor 120 is cooled via the thermal storage tank 160 and sent to the high-pressure compressor 130, and stored in the air storage portion 300 via the aftercooler 150. Low-temperature water from the low-temperature water tank 340 is used for the removal of the heat of compression in the aftercooler 150. In the present invention, an increase and a decrease in the volume of the cushion gas associated with phase changes by heating and cooling are required. The low-temperature water is heated by the heat of compression removed in the aftercooler 150 to produce high-temperature water, which is stored in the high-temperature water tank 330. The high-temperature water is used as a heat source in the expansion step for heating the cushion gas cooled and changed into a low-temperature fluid with a reduced volume. The low-temperature water required for the heat removal in the aftercooler is derived from the high-temperature water whose temperature is reduced by heat exchange with the above low-temperature fluid in the heat exchanger 320 as described later. The low-temperature water is retained in the low-temperature water tank 340, and used while circulated between the low-temperature water tank 340 and the high-temperature water tank 330 alternately. Note that the cooling water 30 and the cooling water 31 are supplied to the low-temperature water tank 340 via three-way valves 341 and 331 which are disposed respectively between the heat exchanger 320 and the low-temperature water tank 340 and between the high-temperature water tank 330 and the heat exchanger 320.

In concurrence with the compression of air, the cushion gas is pressurized within the vessels 301 by the pressure of the compressed air. If the pressure exceeds the critical pressure and temperature further decreases at this time, the cushion gas is changed into a fluid with a significantly reduced volume. Note that the cushion gas introduced into the vessels 301 may be sent to the outside of the vessels and cooled to reduce its volume. As the amount of the air supplied into the vessels 301 increases, the shape of the partial space formed by the film within each vessel 301 in which the compressed air is introduced becomes closer to almost the same shape as that of the internal space of the vessel 301 given by the inner diameter and the length of the vessel. Accordingly, in a state where the inside of each vessel 301 is filled with the compressed air, and the cushion gas has been discharged to the outside of the vessel 301, the film is in intimate contact with the inner surface of the vessel 301.

In the compressed air expansion step, the cushion gas pressurized by the compressed air and further cooled and changed into the fluid with a reduced volume is heated and vaporized, and introduced into the one side of the film within each vessel 301 again, thus returning to the state of the cushion gas before the compression step.

In the expansion step, the pressure of the air stored in the air storage portion 300 decreases as the air is discharged. In the expansion step, the cushion gas cooled and stored as the fluid with a reduced volume in the cushion gas storage portion 310 in the compression step needs to be heated and introduced into the air storage portion 300 again to gradually reduce the space filled with the air and in response thereto gradually increase the space filled with the cushion gas so that replacement takes place within the air storage portion 300. The pressure of the air storage portion is lowered to 5 (MPa), and the cushion gas is changed into a low-temperature gas-liquid mixed phase fluid midway through the expansion step. In order to use this fluid as the cushion gas, the thermal energy stored in the high-temperature water tank 330 in the compression step is used as a heating source for this. This low-temperature mixed phase fluid is heated by heat exchange with the high-temperature water from the high-temperature water tank 330 in the heat exchanger 320, and sent to the air storage portion 300 as the cushion gas. Thus, the air within the air storage portion 300 is pushed out by the cushion gas, and all the space occupied by the air within the vessel 301 is finally replaced with the space occupied by the cushion gas.

The compressed air discharged from the air storage portion 300 is always kept at a constant pressure, for example, 5 (MPa) by a pressure reducing valve (not shown), and sent to the high-pressure expander 230 via the latter part of the regenerative heat exchanger 260. The low-temperature compressed air leaving the air storage portion is heated in the regenerative heat exchanger by high-temperature exhaust heat from the low-pressure expander 220, as described later. Subsequently, the high-pressure expander performs the first power recovery by using this air as driving force. The high-pressure expander 230 drives the electric generator 210 together with the low-pressure expander 220 by the shaft 221.

The low-temperature air leaving the high-pressure expander 230 is sent to the bottom of the thermal storage tank 160 in which the heat of compression generated in the low-pressure compressor 120 is stored in the compression step. This air is directly heated by countercurrent contact with the particulate solid thermal storage material accommodated within the tank.

At the start of the compression step, the pressure and temperature of the air storage portions 300 are set respectively to, for example, 5 (MPa) and 40(° C.), and the gas density of carbon dioxide at this time is 120 (kg/m$^3$). In the compression step, this gas within each air storage portion 300 is pushed out by the storage pressure of the air, and cooled by the cooling water (inlet side: 32, outlet side: 33) in the heat exchanger 320. The pressure of the air storage portion 300 finally becomes 9 (MPa), and concurrently, the pressure of this gas also becomes equal to the pressure of the air. In this state, this gas is changed into a supercritical fluid because the pressure exceeds its critical pressure, and the temperature of this fluid is lowered to 35(° C.) in the present embodiment. Under this condition, the density of this substance is 630 (kg/m$^3$), and the volume thereof decreases to 19% of that at the start of the compression step. On the other hand, in the stored compressed air expansion step, the air is replaced with carbon dioxide, and almost all the capacity of the air storage portion 300 is utilized. As mentioned earlier, in the conventional compressed air energy storage method, the efficiency for utilizing the capacity of space in the air storage portion is 40% or less. The capacity efficiency of the present embodiment is expected to be more than twice the value of the conventional method even if compensating for a need for the cushion gas storage portion 310 in addition to the air storage portion to store the cooled fluid derived from the cushion gas. In other words, twice or more as much air can be stored in the same capacity of space.

The air heated and leaving the top of the thermal storage tank 160 is sent back to the initial part of the regenerative heat exchanger 260, and further heated here and then sent to the combustor 240. A high-temperature gas leaving the combustor 240, which contains the fuel 20 consumed here, is sent to the low-pressure expander 220, in which power recovery is performed again. The temperature of the exhaust gas from this combustor 240 is very high, and thermal energy at a predetermined temperature or more is recovered until a high temperature is reduced to a low temperature through the initial part and the latter part of the regenerative heat exchanger 260 as described above, and the air 11 which has passed through the regenerative heat exchanger 260 is emitted to the atmosphere.

The present invention requires cooling and heating of carbon dioxide as the cushion gas used in the air storage portion 300 for the purpose of increasing and decreasing the volume of the cushion gas due to phase changes. In the present embodiment, as shown in FIG. 2, these cooling and heating are performed by sending carbon dioxide to the outside of the air storage portion 300 formed of a plurality of steel pipes. In this case, vessels for storing carbon dioxide cooled and changed into the fluid with a reduced volume in the air compression step are required. Carbon dioxide leaving the air storage portion 300 is cooled by the cooling water in the heat exchanger 320. At this time, the three-way valve 331 is switched to send the cooling water from a cooling tower (not shown) to this heat exchanger 320. The cushion gas storage portion 310 shown in FIG. 2 is provided as the vessel for storing cooled carbon dioxide. Like the air storage portion 300, the $CO_2$ storage portion is configured from vessels 311, which are formed of a plurality of linear steel pipes arranged in parallel, as shown in an area surrounded by a dotted line in FIG. 2.

Second Embodiment

Figure 2:
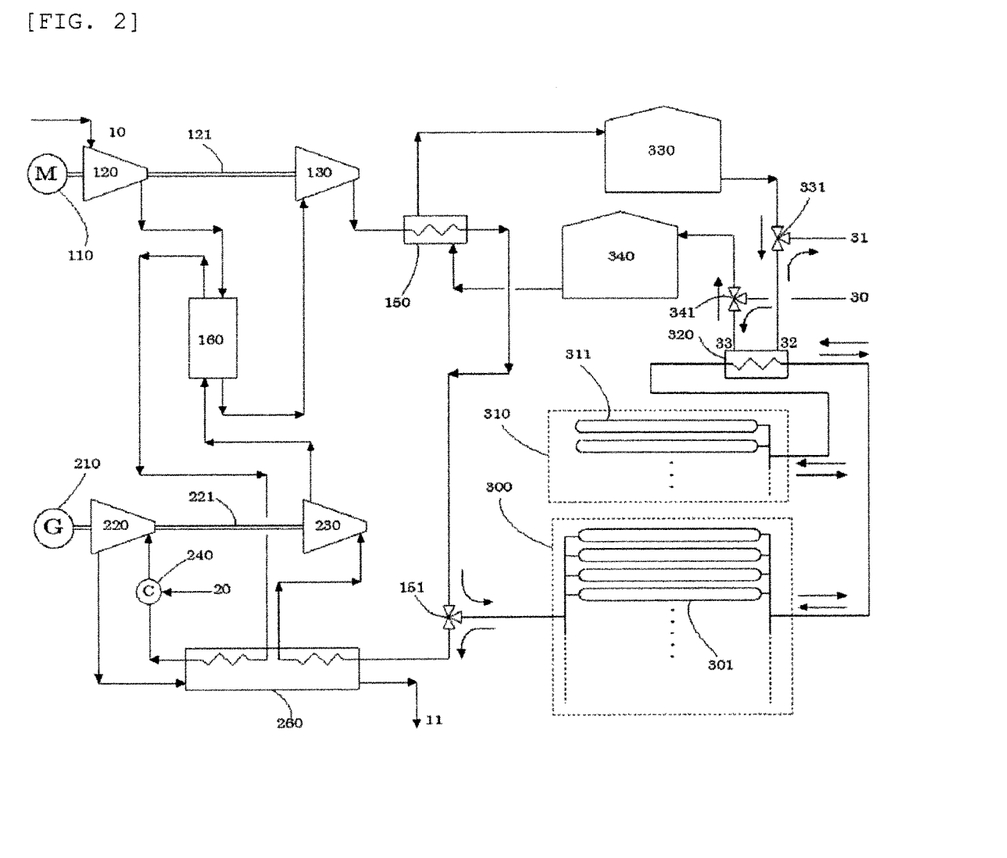

The configuration shown in FIG. 2, in which the steel pipes horizontally disposed are used in the air storage portion, carbon dioxide is used as the cushion gas, and others, is basically common to the present embodiment and the first embodiment. However, within each vessel, a pair of ends of a single film having a length equal to one-half the perimeter of a circular inner surface of the vessel is fixed along and in parallel with an inner wall surface in the pipe length direction to divide the inside of the steel pipe vertically, thereby forming two spaces between which communication of gas is prevented by the film. In this case, the film surfaces of both spaces defined by the film have concave and convex shapes complementary to one another, and the shapes of the two separated by the film interchange with one another midway through each of the air compression and expansion steps. One partial space is filled with the cushion gas and the film surface of this partial space is convex in the compressed gas expansion step preceding the compression step, and the storage of the air is started in the space on the other side of the film. In the present embodiment, the air storage portion 300 is also configured by disposing the vessels 301 formed of a plurality of linear steel pipes arranged in parallel, as shown in the portion surrounded by a dotted line in FIG. 2. The air storage portion 300 is provided on the ground, and the overall configuration of the CAES plant is the same as in the first embodiment shown in FIG. 2. Further, as in the first embodiment, the cushion gas is stored in the plurality of vessels 311 arranged in parallel, as surrounded by a dotted line in the cushion gas storage portion 310 shown in FIG. 2. In other words, the second embodiment is a variation of the first embodiment in which the film is attached in a different way, i.e., the overall configuration, the operating conditions and the manner of operation of the CAES plant are the same as in the first embodiment, except that the way in which the film is attached within the vessel 301 of the air storage portion 300 is different from that in the first embodiment. Accordingly, explanations of those are replaced by the previous descriptions in the first embodiment. Examples of further variations can include, for example, a variation in which, within the steel pipe, at the middle portion in the length direction, one end of a tubular film is fixed to the inner wall surface perpendicularly to the pipe length to divide the length direction into halves by this film, thereby separating the inside into spaces whose capacity increases and decreases, and others.

Each embodiment explained above can be appropriately modified. Variations are described below. In both the above embodiments, the motor, the low-pressure compressor and the high-pressure compressor are combined into one set, including the ancillary equipment for each (for example, coolers or the like), but the entire plant can also be configured from multiple sets of those. Likewise, the entire plant can also be configured by disposing multiple sets of the electric generator, the low-pressure expander and the high-pressure expander.

Further, in either of the above embodiments, while the fluids are stored in the partial spaces at least partially formed of the film, the fluids stored in the partial spaces may be replaced with one another. Specifically, the compressed air may be stored in the partial space on the one side of the film, and the cushion gas may be stored in the partial space on the other side of the film. Alternatively, the cushion gas may be stored in the partial space on the one side of the film, and the compressed air may be stored in the partial space on the other side of the film.

Further, the above vessels 301 do not have to be made of steel. For example, they may be made of concrete or made of reinforced concrete. Further, a resin material or the like may be sprayed on the entire inner surface of the vessel 301 which may be made of steel, or a sheet material such as a resin sheet or the like may be attached thereto. This can improve initial gas-tightness and prevent or reduce decrease in the gas-tightness, which is caused by damage, degradation or the like due to earthquakes or the like during a long period of use.

The above embodiments are described as preferable instances of the present invention, and the method for improving the efficiency for utilizing the capacity of space in the air storage portion described herein is applied to other examples without limitation. Accordingly, the method for effectively utilizing the capacity of space in the compressed air storage portion of the present invention can also be combined with other CAES methods.

The method for storing compressed air energy of the present invention has the mechanism of compressing air, storing the compressed air in a partial space that is different from a space filled with a cushion gas within a vessel and concurrently changing the cushion gas into a fluid with a reduced volume to increase the amount of the stored compressed air, and then vaporizing and restoring this reduced fluid as the cushion gas to decrease the amount of the compressed air remaining within the vessel. By the end of the expansion step preceding the air compression step, the air storage portion is filled with the cushion gas, and thus, the space for the air remaining in this portion can be replaced and eliminated by the space for the cushion gas. In the subsequent compression step, the cushion gas introduced into the air storage portion is also compressed by the storage pressure of the air to reduce its volume, and if this gas is cooled, it is changed into a fluid with a further reduced volume. As a result, in the compression step, the air storage space is increased while not affected by the air remaining in the expansion step, and thus, the amount of air newly added thereto can be increased. This gas is changed into liquid if cooled under a pressure equal to or lower than the critical pressure, but changed into a fluid with a reduced volume without undergoing a phase change into a liquid if cooled under a pressure condition exceeding the critical pressure. The term fluid with a reduced volume herein collectively refers to both the cooled liquid and supercritical fluid. If this fluid is heated and restored to the state of the cushion gas at the start of the compression step, the air stored in the air storage portion can be replaced and eliminated as described above, and the space in the air storage portion can be effectively utilized. However, if mixing of the air as a working gas with the cushion gas occurs, there arises a problem that the cushion gas is also discharged concurrently with the air from the system in the expansion step. Therefore, in the present invention, a film that separates the cushion gas from the air is disposed within the air storage portion, thereby forming partial spaces and preventing the mixing between the two, thus selectively discharging the air to the outside of the system. In this way, the efficiency for utilizing the capacity of space in the air storage portion can be improved, and a net amount of the stored air can be increased. Accordingly, an economical CAES method can be provided.

In the method for storing compressed air energy of the present invention, it is desirable that carbon dioxide alone or a mixture composed mainly of carbon dioxide be used as the cushion gas utilized in the air storage portion.

In the method for storing compressed air energy of the present invention, carbon dioxide alone or a mixture composed mainly of carbon dioxide is used as the cushion gas utilized in the air storage portion. As the density of carbon dioxide changes to an extent greater than that of the air in each of the compression step and expansion step, a high cushion effect can be obtained within the air storage portion. Thus, the efficiency for utilizing the capacity of space in the air storage portion can be significantly improved. Accordingly, an economical CAES method can be provided.

In the method for storing compressed air energy of the present invention, pressure ranges of the cushion gas are preferably such that a minimum pressure in the expansion step is used within a range equal to or lower than a critical pressure of the cushion gas, and a maximum pressure in the compression step is used at 90% or more of the critical pressure of the cushion gas.

In the method for storing compressed air energy of the present invention, pressure ranges of the cushion gas used in the method are such that a minimum pressure in the expansion step is used within a range equal to or lower than a critical pressure of the cushion gas, and a maximum pressure in the compression step is used at 90% or more of the critical pressure of the cushion gas. In general, under a pressure condition near the critical point of any substance or equal to or greater than that, the density of the substance drastically changes with a small change in pressure. In general, a drastic change in density is observed under a pressure condition at more than 90% of a critical pressure. When carbon dioxide is used as the cushion gas, a change in the density of this gas with respect to a pressure change near the critical point of this substance is as follows: the density of carbon dioxide at a pressure of 5 (MPa) and a temperature of 40(° C.) is about 120 (kg/m$^3$); and if the pressure is changed into 9 (MPa), exceeding its critical pressure of 7.4 (MPa) while the temperature remains the same, the density of carbon dioxide increases to 480 (kg/m$^3$) which is about four times the above. Thus, the density of carbon dioxide drastically changes with a change in pressure from a pressure equal to or lower than the critical pressure into a pressure near or greater than the critical pressure. Therefore, a high cushion effect can be obtained under such conditions. Accordingly, an economical CAES method can be provided.

In the method for storing compressed air energy of the present invention, it is preferable that the heat of compression generated by the compression of air be stored in the compression step, and the stored heat of compression be utilized for at least one of heating the air and heating the cushion gas in the expansion step.

In the method for storing compressed air energy of the present invention, the generated heat of compression is stored in the compression step, and the stored heat of compression is utilized for at least one of heating the air and heating the cushion gas in the expansion step. In the compression step, the generated heat of compression is recovered and stored, and in the expansion step, this heat of compression is not only utilized for heating the compressed air, but also utilized as a heating source for the cushion gas cooled and changed into the fluid with a reduced volume. Thus, energy utilization efficiency can be improved, and a need for an external source of the thermal energy required for heating the cushion gas can be avoided or reduced. Accordingly, an economical CAES method can be provided.

While an example of how density changes with respect to pressure is described above, the present invention also takes advantage of a density change due to a temperature change associated with the cooling and heating of the cushion gas in addition to a pressure change. Accordingly, in the present invention, both pressure and temperature contribute to a density change, and thus, a further improved cushion effect can be obtained.

It is preferable that the method for storing compressed air energy of the present invention include a thermal storage step of storing the heat of compression, and the thermal storage step at least include a step of absorbing the heat of compression with water and storing the water which has absorbed the heat in a tank.

The method for storing compressed air energy of the present invention includes a thermal storage step of storing the heat of compression, and the thermal storage step at least includes a step of absorbing the heat of compression with water and storing the water which has absorbed the heat in a tank. Therefore, the heat of compression can be utilized for heating rather than discharged wastefully. Accordingly, an economical CAES method can be provided.

In the present invention, in addition to the air as a working gas, the cushion gas is interposed in the air storage portion formed of steel pipes or steel vessels in CAES plants, and thus, the amount of the air stored in the air compression step can be increased, and the amount of the air remaining in the air storage portion in the air expansion step can be decreased. As a result, an increased air storage amount in the air storage portion can be achieved, and the capacity of storage space can be effectively utilized. While the plant cost of the air storage portion formed of steel vessels including steel pipes is high, the plant cost of a CAES system provided with the above air storage vessels can be reduced owing to the improved capacity utilization efficiency in this portion.

An air storage portion formed of steel vessels such as steel pipes or the like is advantageous as an above-ground installation, and a cost reduction in this portion can contribute to the achievement of an economical above-ground CAES system. If CAES plants can be installed on the ground, installation sites for the plants can be selected without concern for constraints on site conditions such as formations and others as before.

One of the advantages obtained by the above examples is that the capacity of space in the compressed air storage portion can be most effectively utilized by using the cushion gas. While a high plant cost of the air storage portion becomes problematic in methods for storing compressed air in steel vessels including steel pipes, the problem can be solved by the present invention using the cushion gas, and the cost of the CAES plants installed on the ground can be reduced.

REFERENCE SIGNS LIST

- 10, 11: air
- 20, 21: fuel
- 30, 31, 32, 33: cooling water
- 110: motor
- 120: low-pressure compressor
- 121, 221: shaft
- 130: high-pressure compressor
- 140, 150: aftercooler
- 151, 331, 341: three-way valve
- 160: thermal storage tank
- 210: electric generator
- 220: low-pressure expander
- 230: high-pressure expander
- 240, 250: combustor
- 260: regenerative heat exchanger
- 300: air storage portion
- 301: vessel (for storing compressed air)
- 310: cushion gas storage portion
- 311: vessel (for storing cushion gas)
- 320: heat exchanger
- 330: high-temperature water tank
- 340: low-temperature water tank

The invention claimed is:

1. A method for storing compressed air energy comprising, a compression step of converting electricity into energy of compressed air and storing the compressed air in one or more vessels, and an expansion step of expanding the stored compressed air to recover the electricity, the compression step and the expansion step being performed alternately, wherein the vessels are such that, in all or part of the vessels, a single film or a plurality of films to form spaces having surfaces with freely deformable shapes is disposed within each vessel, thereby forming a plurality of partial spaces within the vessel, by the start of the compression step, the partial space formed on one side of the surfaces of the film within the vessel is filled with a cushion gas, in the compression step, the compressed air is stored in the partial space on the other side of the surfaces of the film within the vessel without being mixed with the cushion gas, and the cushion gas is changed into a fluid with a reduced volume while retained within the vessel or sent to the outside of the vessel, thereby increasing the amount of the compressed air stored in the partial space on the other side of the surfaces, and in the expansion step, the fluid present within or outside the vessel is vaporized and restored as the cushion gas in the partial space on the one side of the surfaces within the vessel, thereby decreasing the amount of the compressed air remaining within the vessel.

2. The method for storing compressed air energy according to claim 1, wherein carbon dioxide alone or a mixture composed mainly of carbon dioxide is used as the cushion gas.

3. The method for storing compressed air energy according to claim 1, wherein pressure ranges of the cushion gas are such that a minimum pressure in the expansion step is used within a range equal to or lower than a critical pressure of the cushion gas, and a maximum pressure in the compression step is used at 90% or more of the critical pressure of the cushion gas.

4. The method for storing compressed air energy according to claim 1, wherein heat of compression generated by the compression of air is stored in the compression step, and the stored heat of compression is utilized for at least one of heating the compressed air and heating the cushion gas in the expansion step.

5. The method for storing compressed air energy according to claim 4, wherein the method comprises a thermal storage step of storing the heat of compression, and the thermal storage step at least includes a step of absorbing the heat of compression with water and storing the water which has absorbed the heat in a tank.

\* \* \* \* \*